April 12, 1966 J. A. CLARKE 3,245,867
WOOD PARTICLE BOARD AND A METHOD OF MAKING THE SAME
Filed May 6, 1963
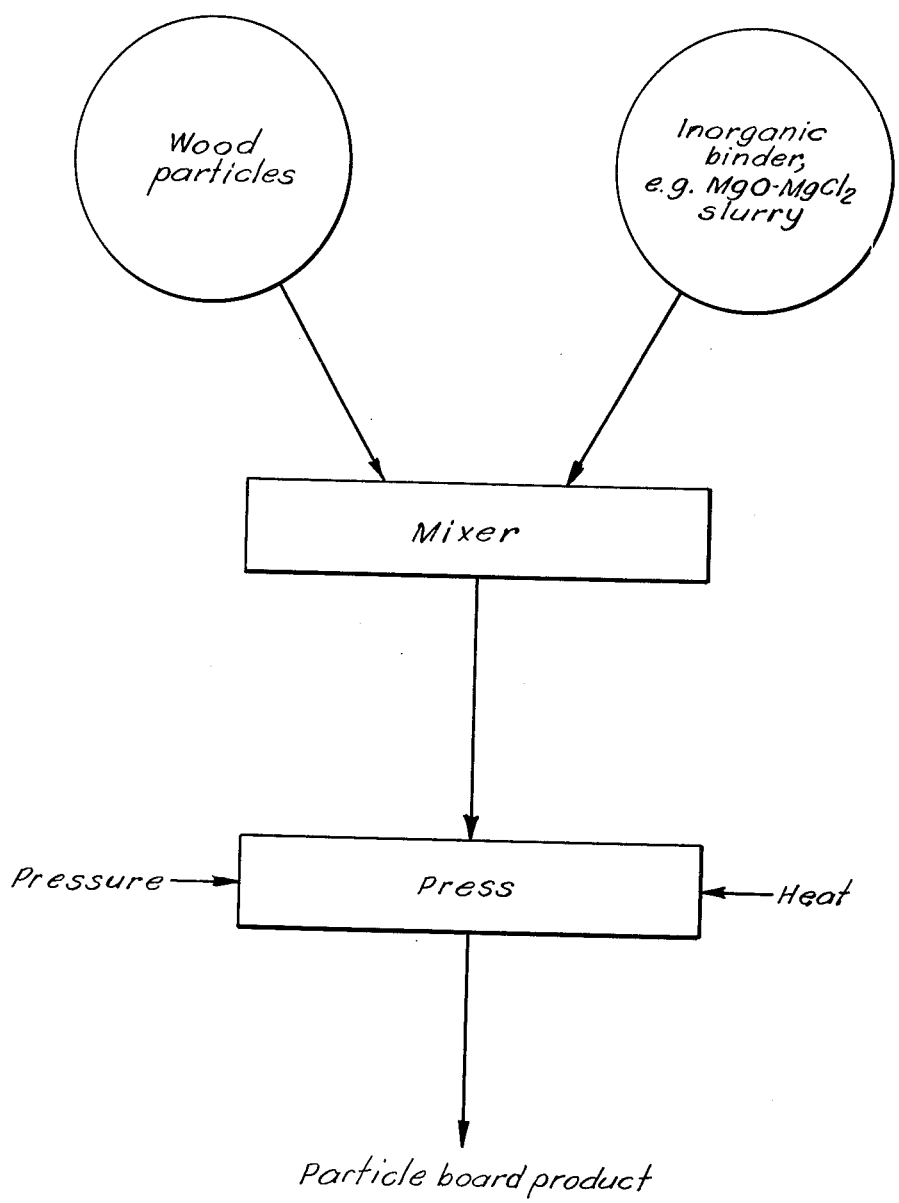
INVENTOR.
James A. Clarke
BY
L.S. Jowanowitz
ATTORNEY United States Patent Office 3,245,867
Patented Apr. 12, 1966

3,245,867
WOOD PARTICLE BOARD AND A METHOD OF MAKING THE SAME
James A. Clarke, Lake Jackson, Tex., assignor to The Dow Chemical Company, Midland, Mich., a corporation of Delaware
Filed May 6, 1963, Ser. No. 278,482
7 Claims. (Cl. 161—168)

The present invention relates to shaped articles formed from particles of wood held together by an inorganic binder. More specifically, the invention concerns a method for preparing such wood particle board having improved physical characteristics.

The term "particle board" is employed herein to designate a structural wood product which is prepared by contacting a quantity of wood particles with an inorganic binder and forming the resulting mixture into a cohesive mass by the application of heat and pressure. Certain additives are additionally employed when particular properties are desired.

Both organic and inorganic bonding materials are presently employed in the commercial production of wood particle board. While the physical characteristics of these particle boards are as widely varied as the purposes for which they are utilized, continuing efforts have been especially directed towards the formulation of a product having improved strength, fire resistance and moisture resistance properties combined in a low cost board which is suited to carpentry operations such as nailing, sawing, etc. Since a large demand, active and potential, exists for particle board use in interior and exterior paneling, it is also extremely desirable for such board to possess an attractive surface appearance.

It is, accordingly, an object of the present invention to provide a particle board which possesses, in combination, desirable improvements in the characteristics enumerated above. It is another object of the invention to provide a method for producing such a particle board. Other objects and advantages of the present invention will become evident from the following description.

The accompanying drawing illustrates, by means of a flow sheet, the general method of the present invention wherein wood particles and an inorganic binder slurry are contacted in a mixer and the resulting composite mass is subjected to heat and pressure in a press to form the particle board product of the present invention.

In the general method of the present invention a slurry of magnesium chloride, magnesium bromide or magnesium sulfate or mixtures thereof with magnesium oxide and water is sprayed onto wood particles or, alternatively, the particles are sprayed with aqueous magnesium chloride, bromide or sulfate frequently termed a "gauging solution," and then dusted with magnesium oxide and the mixture is shaped into a mat which is then subjected to heat and pressure to form a particle board. Optional additional steps include the incorporation of certain components in the wood particle-binder mixture, to improve certain physical characteristics. The ratios of the binder components, i.e. magnesium chloride, magnesium sulfate, magnesium bromide, magnesium oxide and water, to each other; the ratio of the binder mixture to the wood particles; the moisture content of the wood particles; the amount of pressure, the temperature and length of time involved in the pressing operation; and, when used, the amount and type of additives are all carefully controlled in the method of the present invention.

The wood particles employed in the method of the present invention include sawdust, wood splinters, wood chips, planer shavings, hammer milled fir, Douglas fir flakes and the like as well as mixtures thereof. The characteristics of the particle board are dependent to a considerable extent upon the type of wood particles employed; however, when employing the same type of wood particles in both the prior art and the present methods, a significant general improvement in particle board characteristics results when the method of the present invention is followed. When an attractive surface appearance is especially desired, in combination with other previously discussed properties, wood chips such as, for example, Douglas fir flakes of approximately ½" x 1½" x 0.010" are preferred.

The moisture content of the wood particles is preferably adjusted to from about 7 to 12 weight percent prior to addition of the binder. This may be done, for example, by directing a current of dry air through the flakes. A moisture content of the wood particle-binder mixture, as it enters the pressing operation, of from about 9 to 23 weight percent of the total mixture is permissable with a moisture content of from about 14 to 16 weight percent preferred.

The binder is advantageously applied to the wood flakes either (1) by spraying aqueous magnesium chloride, bromide or sulfate onto the wood particles followed by dusting magnesium oxide powder on this mixture or (2) by spraying the combined aqueous magnesium chloride-(bromide or sulfate)-magnesium oxide binder slurry onto the wood particles. In both of these methods the wood particles are preferably tumbled about as the binder components are applied. Regardless of the method utilized, the resulting inorganic binder-wood particle composite mass is shaped into a mat which is subjected to heat and pressure to form the particle board product.

The mole ratio of magnesium oxide:magnesium chloride employed is from about 4:1 to 7:1 with a ratio of about 6:1 preferred. The mole ratio of water:magnesium chloride in the binder is adjusted to give the desired moisture content of about 14 to 16 percent in the wood particle-binder mixture entering the pressing operation. This mole ratio varies according to the wood moisture content but is usually in the range of 16:1 to 25:1, water:magnesium chloride with 21:1 a typical value which would be employed when the moisture content of the wood is about 8.7 weight percent. The weight ratio of wood particles on a dry basis to solids content of the binder employed, i.e. magnesium oxide and magnesium chloride, is from about 10:1 to 4:1 with a ratio of about 5:1 preferred. In all of the above compositions the magnesium chloride may be replaced completely or partially by either magnesium bromide or magnesium sulfate. If magnesium bromide is employed the extra advantage of increased fire retardance is achieved.

At these ratios, the binder components are distributed within the wood cell structure of the individual particles in a manner such that no excess binder is present at the interface between particles. The highly advantageous result of this distribution of binder components is visually apparent since the binder, which is normally a white or gray color, is not seen and the wood particles of the board which form the visible surface present a more pleasing and decorative appearance. It should be noted that some of the moisture present is released during the hot pressing operation. A typical analysis of the board product at equilibrium with normal atmospheric conditions is as follows:

| Component | Grams | Weight percent |
|---|---|---|
| Wood (dry) | 100 | 73.1 |
| Binder solids | 20 | 14.6 |
| $H_2O$ (free and combined with binder) | 16.8 | 12.3 |

The activity of the magnesium oxide employed in the binder is an important factor in determining the strength properties of the particle board. Magnesium oxide having an iodine number of from about 7 to 17 is preferred for use in the present invention. This iodine number is found by a procedure (described in "Adsorption" by C. L. Mantell, 2d ed., 1951, pp. 563–4) in which a weighed amount of magnesia is agitated with a known amount of an 0.05-normal solution of iodine, dissolved in carbon tetrachloride, and then determining the amount of iodine which has been adsorbed by the magnesia surface. An increase in magnesia activity is reflected by an increase in the iodine number and a generally faster setting time of the binder.

The moisture resistance properties of the particle board are improved by the addition of stearic acid. Inclusion of from about 3 to 12 weight percent stearic acid in the binder slurry, based on the weight of dry wood particles employed, improves the resistance of the particle board product to the adsorption of water and also reduces the percent volume increase when the board is soaked in water.

After the addition of binder to the wood particles is complete, the binder-wood particle mixture is formed into a mat which is subjected to heat and pressure to produce the particle board product of the present invention. The platen temperature during the pressing operation is maintained at from about 240 degrees to 300 degrees F. for a period of time from about 5 to 20 minutes. An initial pressure of from about 250 to 450 lbs. per square inch is normally employed during this operation. As the binder sets this pressure may drop to 100 p.s.i. or lower depending upon the thickness and board density desired. For extremely high density boards, higher initial pressures may be employed. The density of this particle board is from about 30 to 65 pounds per cubic foot depending upon the type of wood particles employed, the temperatures and pressures utilized and the thickness of the mat formed prior to pressing operations. The product board is produced in thicknesses ranging from about ¼ inch to 1½ inch.

The following examples describe completely representative specific embodiments of the present invention. The examples, however, are not to be interpreted as limiting the invention other than as defined in the claims. The modulus of rupture and internal bond values reported in the examples below were determined in accordance with Sections 10–19 and 27–32, respectively, of ASTM designation D–1037.

Example 1

A binder slurry was prepared from 114.8 grams of particulate, 150 U.S. Standard mesh magnesium oxide, 96.3 grams of $MgCl_2 \cdot 6H_2O$, and 128 grams of water. This mixture provided a 6:1 mole ratio of magnesium oxide to magnesium chloride and a 21:1 mole ratio of water to magnesium chloride. The magnesium oxide had an iodine number of 12.4. The binder slurry was then sprayed as a fine mist onto 870 g. of wood flakes as they were actively tumbled in a cement mixer type chamber. The wood flakes had a moisture content of about 8 weight percent. The slurry added to the wood flakes provided, on a dry basis, 160 grams of binder solids to 800 grams wood, or 20 parts by weight of binder per 100 parts by weight of wood. About 30 percent of the binder solids were not taken-up by the wood flakes and this resulted in a binder solids content of about 14 parts by weight per 100 parts of wood in the final particle board product. Then 550 grams of the wet sprayed flakes were collected in a deckle box, prepressed by hand into a mat, and then hot pressed at 250 degrees F. and 220 pounds per square inch initial pressure for 15 minutes. During this period of time the initial pressure gradually diminished to 120 p.s.i. as the wood became plasticized and compressed more readily. This formed a solid particle board with dimensions of 10" by 13½" by 5/16" and a density of approximately 50 lbs./ft.$^3$. This board had a modulus of rupture, hereafter M.O.R., of 3400 p.s.i. and an internal bond, hereafter I.B., of 120 p.s.i. After soaking in cold water for 24 hours the board showed a weight gain of 55 percent and a percent volume increase of 27 percent. The board lost weight when in contact with a direct flame but did not support combustion.

Example 2

The activity of the MgO employed in the binder was varied in the preparation of a series of particle boards to demonstrate the effect of activity on board strength. The procedure of Example 1 was followed in all other respects. Table I, below, illustrates the advantage of utilizing a MgO of intermediate activity in the binder formulation when maximum strength is desired.

TABLE I

| MgO, Iodine No. | Internal Bond, p.s.i. | M.O.R., p.s.i. |
|---|---|---|
| 12.4 | 75 | 2,500 |
| 13.0 | 84 | 2,300 |
| 15.2 | 73 | 2,450 |
| 16.4 | 65 | 2,625 |
| 19.3 | 45 | 1,900 |

Example 3

An important factor influencing particle board strength is the ratio of $MgO:MgCl_2$ employed in the binder. This ratio was varied in a series of particle boards otherwise prepared in accordance with Example 1, except that the wood was employed in the form of sawdust rather than flakes. Table II, below, shows the effect on strength qualities, as measured by internal bond and M.O.R. tests, when the $MgO:MgCl_2$ mol ratio is varied over a range of about 2:1 to 9:1. Repeated experiments indicated maximum strength qualities were attained in particle board prepared by utilizing a $MgO:MgCl_2$ mol ratio of about 6:1.

TABLE II

| $MgO:MgCl_2$ mol ratio | Internal Bond, p.s.i. | M.O.R., p.s.i. |
|---|---|---|
| 2.2:1 | 88 | 525 |
| 4.4:1 | 113 | 690 |
| 6.6:1 | 126 | 860 |
| 8.8:1 | 96 | 550 |

Example 4

The influence of the amount of binder solids present in the wood particle board on the strength qualities of the board is shown in Table III, below. In each case the internal bond value is measured for particle board prepared in accordance with Example 1 but containing the indicated amount of binder solids. The content is expressed as parts by weight of binder solids per hundred parts by weight of dry wood in the final particle board product. The results indicate that maximum internal bond strength is obtained when the board product contains about 21 parts of binder solids per 100 parts of dry wood.

TABLE III

| Binder Content | Internal Bond, p.s.i. |
|---|---|
| 15.5 | 112 |
| 17.3 | 124 |
| 21.0 | 147 |
| 22.9 | 141 |
| 25.9 | 125 |
| 37.8 | 113 |

The other particle board properties, which are influenced by binder content, are those of percent volume increase, i.e. percent swell, and percent weight increase due to water absorption. These two properties, measured in accordance with ASTM Tests D–1037, are correlated for particle boards prepared with varying binder content and by the method of Example 1 in which particle boards were immersed in room temperature water for a 24 hour soak period. When less than about 14 parts by weight of binder solids per 100 parts by weight of dry wood is employed, the board product tends to delaminate. The strength qualities are otherwise relatively unaffected by moisture absorption and swelling. The data resulting from the tests referred to above is compiled in Table IV, below.

TABLE IV

| Binder Content | Percent, Swell | Percent, Water Absorption |
|---|---|---|
| 17.3 | 33 | 69 |
| 22.9 | 14.6 | 40 |
| 25.9 | 17 | 50 |
| 37.8 | 7.9 | 35 |

*Example 5*

In the pressing operation which forms the binder-wood particle mixture into a cohesive mass, the length of time and the temperature and pressure employed to form the shaped article all influence the strength qualities. Numerous experiments have established certain criteria for these factors in order to prepare maximum strength boards by utilizing the procedure of the present invention. The temperature employed must be in the range of from about 240 degrees to 300 degrees F. regardless of the time and pressure employed. Within this temperature range a temperature of about 250 to 280 degrees F. is preferably employed for a period of from about 8 to 16 minutes and at a pressure of from about 320 to 450 p.s.i.

*Example 6*

Following the procedure of Example 1 (wherein a 6:1 mole ratio of $MgO:MgCl_2$, MgO having an iodine number of 12.4, a binder content of 16 parts binder solids per 100 parts dry wood, a final moisture content of 18 weight percent, and an initial pressure of 100–650 p.s.i. at 250 degrees F. for 15 minutes were employed) various types of wood particles were employed to prepare particle boards in accordance with the method of the present invention. The physical characteristics of these boards are listed in Table V, below.

TABLE V

| Particle Type | Board Density, lbs./ft.$^2$ | Thickness, in. | I.B. | M.O.R. | Equilibrium, Pressure[1], p.s.i. |
|---|---|---|---|---|---|
| Hammer-milled fir | 30.8 | 1¼ | 53.7 | 403 | 50 |
| Hammer-milled fir | 38.1 | 1 | 81 | 665 | 90 |
| Douglas fir flakes | 48.5 | ¼ | 121 | 3,400 | 150 |
| Douglas fir flakes | 64.3 | 1/20 | 84 | 3,650 | 650 |

[1] The equilibrium pressure is that pressure which is maintained after compression of the mat to the specified thickness.

*Example 7*

A board product was prepared by the method of Example 1 with the exception that a quantity of 0.3 gram of a fatty amidophosphate surfactant (a product of the Leyda Chemical Company sold under the tradename of "Leyco Fos N") and 43 grams of powdered stearic acid were added to the binder slurry. These two additions were made separately and in the sequence stated. After these additives were stirred into the binder slurry, the slurry was sprayed onto the wood particles and the procedure of Example 1 was continued. The board product, which contained about 3.5 weight percent stearic acid, was tested for moisture resistance qualities in accordance with the procedure of Sections 69–75 of ASTM designation D–1037. The improvement resulting from the inclusion of stearic acid is shown in Table VI by comparison of the percent volume increase (percent swell) and percent weight increase (percent water absorption) after a 24 hour immersion in cold water of two otherwise identically prepared boards.

TABLE VI

| Board | Percent, Water Absorption | Percent, Swell |
|---|---|---|
| No stearic acid | 55 | 24 |
| 3.5 wt. percent, stearic acid | 38 | 22 |

*Example 8*

A binder slurry was prepared from 172.2 grams of particulate, 150 U.S. Standard mesh magnesium oxide, 131.5 grams of magnesium bromide and 150 grams of water. This mixture provided a 6:1 mole ratio of magnesium oxide to magnesium bromide and a 21:1 mole ratio of water to magnesium bromide. The magnesium oxide had an iodine number of 12.4. The binder slurry was then applied to 1,000 grams of Douglas fir flakes and the resulting composite was formed into a board in the manner described in Example 1. After conditioning, the board had the following characteristics:

Internal bond _____ p.s.i.__ 161
Modulus of rupture _____ p.s.i.__ 2910
24 hour cold water immersion:
   (a) water absorption _____ percent__ 59
   (b) swell _____ percent__ 25

A burning characteristics test was conducted on a sample of the board prepared in this example by applying a propane torch flame to one surface of the board for a total of 10 minutes. At 4.2 minutes the flame penetrated the board which was 0.310 inch in thickness. The board showed a total weight loss of 13.68 grams due to 10 minutes application of the propane flame.

*Example 9*

A binder mixture was prepared from 172.2 grams of magnesium oxide, 32.9 grams of magnesium bromide and 132.0 grams of $MgSO_4 \cdot 7H_2O$. This was applied to 1,000 grams of Douglas fir flakes and the resulting composite was formed into a board in the manner described in Example 1. After conditioning, the board had the following characteristics:

Internal bond _____ p.s.i.__ 128
Modulus of rupture _____ p.s.i.__ 3010
24 hour cold water immersion:
   (a) water absorption _____ percent__ 63
   (b) swell _____ percent__ 36

A burning characteristics test was conducted on a board from this example by applying a propane torch flame to one surface of the board for a total of 10 minutes. At 4.25 minutes, the flame penetrated the 0.308 inch thickness of the board and it lost a total of 18.76 grams in weight due to the 10 minutes exposure to the flame.

I claim:
1. A wood particle board characterized by:
   (a) a density of from about 30 to 65 pounds per cubic foot,
   (b) a thickness from about ¼ to 1½ inches,
   (c) an internal bond of from about 50 to 160 pounds per square inch, and
   (d) a modulus of rupture of from about 400 to 4,000 pounds per square inch,
said particle board having less than 23 parts by weight of water and having from about 10 to 25 parts by weight of binder solids per 100 parts by weight of dry wood particles; said binder solids consisting of from about 4 to 7 moles of MgO, having an iodine number of from about 7 to 17, per mole of a member selected from the group consisting of $MgCl_2$, $MgSO_4$ and $MgBr_2$.

2. A wood particle board characterized by:
   (a) a density of from about 30 to 65 pounds per cubic foot,
   (b) a thickness from about ¼ to 1½ inches;
   (c) an internal bond of from about 50 to 160 pounds per square inch, and
   (d) a modulus of rupture of from about 400 to 4,000 pounds per square inch,
said particle board having less than 23 parts by weight of water and having from about 3 to 12 parts by weight of stearic acid per 100 parts by weight of dry wood particles and from about 10 to 25 parts by weight of binder solids per 100 parts by weight of dry wood particles; said binder solids consisting of from about 4 to 7 moles of MgO, having an iodine number of from about 7 to 17, per mole of a member selected from the group consisting of $MgCl_2$, $MgSO_4$ and $MgBr_2$.

3. In a process which comprises the steps of contacting a quantity of wood particles with a member selected from the group consisting of magnesium chloride, magnesium bromide and magnesium sulfate in the presence of magnesium oxide and water and applying heat and pressure to the resulting composite mass to form a particle board, the improvement which comprises the steps of:
   (A) preparing a composite mass having,
      (1) from about 10 to 25 parts by weight of binder solids per 100 parts by weight of dry wood particles, said binder solids consisting of from about 4 to 7 moles of MgO per mole of a member selected from the group consisting of $MgCl_2$, $MgBr_2$ and $MgSO_4$, said MgO having an iodine number of from about 7 to 17,
      (2) from about 9 to 23 parts by weight of water per 100 parts by weight of dry wood particles, and
   (B) subjecting said composite mass to a pressure of from about 100 to 450 p.s.i. at a temperature of from about 240° to 300° F. for a period of about 5 to 30 minutes,
whereby a particle board having a thickness of about ¼ to 1½ inches is formed.

4. The process of claim 3 wherein from about 3 to 12 parts by weight of stearic acid per 100 parts by weight of dry wood particles are incorporated in said composite mass.

5. The process of claim 3 wherein said composite mass is:
   (A) prepared by providing:
      (1) from about 15 to 22 parts by weight of binder solids per 100 parts by weight of dry wood particles, said binder solids consisting of from about 5.5 to 6.5 moles of MgO per mole of a member selected from the group consisting of $MgCl_2$, $MgBr_2$ and $MgSO_4$, said MgO having an iodine number of from about 10 to 15,
      (2) from about 14 to 18 parts by weight of water per 100 parts by weight of dry wood particles, and
   (B) subjected to an initial pressure of from about 320 to 400 p.s.i. at a temperature of from about 250° to 280° F. for a period of from about 10 to 20 minutes.

6. In a process which comprises the steps of contacting a quantity of wood particles with magnesium oxide and magnesium chloride binder solids in the presence of water and applying heat and pressure to the resulting composite mass to form a particle board, the improvement which comprises the steps of:
   (A) preparing a composite mass having,
      (1) from about 10 to 25 parts by weight of binder solids per 100 parts by weight of dry wood particles, said binder solids consisting of from about 4 to 7 moles of MgO per mole of $MgCl_2$, said MgO having an iodine number of from about 7 to 17,
      (2) from about 9 to 23 parts by weight of water per 100 parts by weight of dry wood particles, and
   (B) subjecting said composite mass to a pressure of from about 100 to 450 p.s.i. at a temperature of from about 240° to 300° F. for a period of about 5 to 30 minutes.

7. The process of claim 3 wherein said composite mass is:
   (A) prepared by providing:
      (1) from about 15 to 22 parts by weight of binder solids per 100 parts by weight of dry wood particles, said binder solids consisting of from about 5.5 to 6.5 moles of MgO per mole of $MgCl_2$, said MgO having an iodine number of from about 10 to 14, and
   (B) subjected to an initial pressure of from about 320 to 400 p.s.i. at a temperature of from about 250° to 280° F. for a period of from about 10 to 20 minutes.

References Cited by the Examiner

UNITED STATES PATENTS

| | | | |
|---|---|---|---|
| 2,655,458 | 10/1953 | Collins | 264—109 |
| 2,944,291 | 7/1960 | Prior et al. | 264—123 XR |
| 3,011,900 | 12/1961 | Glab | 106—163 |

OTHER REFERENCES

German printed application (Homann, A.G.F.) 1,137,370, Sept. 27, 1962 (2 pp. spec.; no dwg.).

ROBERT F. WHITE, *Primary Examiner.*

ALEXANDER H. BRODMERKEL, ALFRED L. LEAVITT, *Examiners.*